United States Patent
Schwarz et al.

(10) Patent No.: US 10,233,774 B2
(45) Date of Patent: Mar. 19, 2019

(54) THREE SPOOL TURBOFAN ENGINE WITH LOW NOISE INTERMEDIATE TURBINE ROTOR

(71) Applicant: UNITED TECHNOLOGIES CORPORATION, Hartford, CT (US)

(72) Inventors: Frederick M. Schwarz, Glastonbury, CT (US); Bruce L. Morin, Springfield, MA (US)

(73) Assignee: United Technologies Corporation, Farmington, CT (US)

( * ) Notice: Subject to any disclaimer, the term of this patent is extended or adjusted under 35 U.S.C. 154(b) by 503 days.

(21) Appl. No.: 14/905,994

(22) PCT Filed: Jul. 2, 2014

(86) PCT No.: PCT/US2014/045180
§ 371 (c)(1),
(2) Date: Jan. 19, 2016

(87) PCT Pub. No.: WO2015/026444
PCT Pub. Date: Feb. 26, 2015

(65) Prior Publication Data
US 2016/0153310 A1    Jun. 2, 2016

Related U.S. Application Data

(60) Provisional application No. 61/867,215, filed on Aug. 19, 2013.

(51) Int. Cl.
*F01D 25/04*    (2006.01)
*F04D 29/32*    (2006.01)
(Continued)

(52) U.S. Cl.
CPC .............. *F01D 25/04* (2013.01); *F01D 5/06* (2013.01); *F01D 5/142* (2013.01); *F01D 9/06* (2013.01);
(Continued)

(58) Field of Classification Search
CPC ...... F04D 29/66; F04D 29/661; F04D 29/663; F04D 29/666; F05D 2260/96
See application file for complete search history.

(56) References Cited

U.S. PATENT DOCUMENTS 3,194,487 A   7/1965 Tyler et al.
6,004,095 A   12/1999 Waitz et al.
(Continued)

FOREIGN PATENT DOCUMENTS

EP    2540989 A2    1/2013
WO    2013-116262 A1    8/2013

OTHER PUBLICATIONS

C. Riegler et al., "The Geared Turbofan Technology—Opportunities, Challenges and Readiness Status," Sep. 11, 2007.
(Continued)

*Primary Examiner* — Jason D Shanske
*Assistant Examiner* — Brian O Peters
(74) *Attorney, Agent, or Firm* — Carlson, Gaskey & Olds, P.C.

(57) ABSTRACT

A turbine section including a high pressure turbine, an intermediate pressure turbine and a fan drive turbine, the fan drive turbine driving a gear reduction to in turn drive a fan, and effecting a reduction in the speed of the fan relative to an input speed from the fan drive turbine and said high pressure turbine driving a high pressure compressor, and the intermediate pressure turbine driving a low pressure compressor, with the intermediate pressure turbine having a number of turbine blades in at least one row, and the turbine
(Continued)

blades operating at least some of the time at a rotational speed, and the number of turbine blades in the at least one row, and the rotational speed being such that the following formula holds true for the at least one row of the intermediate pressure turbine: (number of blades×speed)/60≥5500 Hz.

11 Claims, 1 Drawing Sheet

(51) Int. Cl.
| | |
|---|---|
| *F01D 15/12* | (2006.01) |
| *F01D 9/06* | (2006.01) |
| *F01D 5/06* | (2006.01) |
| *F01D 17/10* | (2006.01) |
| *F02C 3/107* | (2006.01) |
| *F01D 5/14* | (2006.01) |
| *F02K 3/06* | (2006.01) |

(52) U.S. Cl.
CPC ........... *F01D 15/12* (2013.01); *F01D 17/105* (2013.01); *F02C 3/107* (2013.01); *F02K 3/06* (2013.01); *F04D 29/321* (2013.01); *F04D 29/325* (2013.01); *F05D 2220/32* (2013.01); *F05D 2220/36* (2013.01); *F05D 2240/24* (2013.01); *F05D 2260/40311* (2013.01); *F05D 2260/96* (2013.01); *F05D 2270/02* (2013.01); *F05D 2270/333* (2013.01); *Y02T 50/673* (2013.01)

(56) References Cited

U.S. PATENT DOCUMENTS

2005/0226720 A1  10/2005  Harvey et al.
2013/0202403 A1  8/2013  Morin et al.

OTHER PUBLICATIONS

International Search Report for corresponding PCT application PCT/US2014/045180.
International Preliminary Report on Patentability for International Application No. PCT/US2014/045180 dated Mar. 3, 2016.

THREE SPOOL TURBOFAN ENGINE WITH LOW NOISE INTERMEDIATE TURBINE ROTOR

CROSS-REFERENCE TO RELATED APPLICATION

This application claims priority to U.S. Provisional Application No. 61/867,215, filed Aug. 19, 2013.

BACKGROUND

This application relates to the design of a gas turbine engine rotor which can be operated to produce noise that is less sensitive to human hearing.

Gas turbine engines are known, and typically include a fan delivering air into a compressor. The air is compressed and delivered downstream into a combustor section where it was mixed with fuel and ignited. Products of this combustion pass downstream over turbine rotors, driving the turbine rotors to rotate.

In a two spool engine, there is a high pressure turbine rotor, and a low pressure turbine rotor. Each of the turbine rotors include a number of rows of turbine blades which rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades which rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

In another type of gas turbine engine, there are three turbines, with a higher pressure turbine driving the high pressure compressor. An intermediate turbine drives the low pressure compressor. A low pressure turbine drives the fan. Such engines will also have the noise problems as discussed above.

It is known to provide a particular relationship between the number of blades in a low pressure compressor, or in the low pressure turbine, and the speed of an associated rotor. No such relationship has ever been extended to the intermediate turbine, which would be spaced further into the engine from either the low pressure compressor or low pressure turbine.

SUMMARY OF THE INVENTION

In a featured embodiment, a gas turbine engine has a turbine section including a high pressure turbine, an intermediate pressure turbine and a fan drive turbine. The fan drive turbine drives a gear reduction to in turn drive a fan, and effects a reduction in the speed of the fan relative to an input speed from the fan drive turbine. The high pressure turbine drives a high pressure compressor. The intermediate pressure turbine drives a low pressure compressor. The intermediate pressure turbine has a number of turbine blades in at least one row. The turbine blades operate at least some of the time at a rotational speed. The number of turbine blades in the at least one row, and the rotational speed are such that the following formula holds true for the at least one row of the intermediate pressure turbine (number of blades×speed)/60≥5500 Hz.

In another embodiment according to the previous embodiment, the formula results in a number greater than or equal to 6000 Hz.

In another embodiment according to any of the previous embodiments, the gas turbine engine is rated to produce 15,000 pounds of thrust or more.

In another embodiment according to any of the previous embodiments, the rotational speed is an approach speed.

In another embodiment according to any of the previous embodiments, the formula holds true for the majority of blade rows of the intermediate pressure turbine.

In another embodiment according to any of the previous embodiments, the gas turbine engine is rated to produce 15,000 lbs. of thrust or more.

In another embodiment according to any of the previous embodiments, the formula holds true for the majority of blade rows of the intermediate pressure turbine.

In another embodiment according to any of the previous embodiments, the fan delivers air into a bypass duct and into a compressor section as core air. A ratio of the volume of air delivered into the bypass duct compared to the volume of air delivered as core air is greater than or equal to about 6.

In another featured embodiment, a method of designing a gas turbine engine includes the steps of including a gear reduction between a fan drive turbine and a fan. A high pressure turbine drives a high pressure compressor downstream of the fan, and includes an intermediate pressure turbine intermediate the high pressure turbine and the fan drive turbine. The intermediate pressure turbine drives a low pressure compressor which is intermediate the fan and the high pressure compressor. A number of blades is selected in at least one row of the intermediate pressure turbine, in combination with a rotational speed of the intermediate pressure turbine, such that the following formula holds true for the at least one row of the intermediate pressure turbine (number of blades×speed)/60≥5500 Hz.

In another embodiment according to the previous embodiment, the formula results in a number greater than or equal to 6000.

In another embodiment according to any of the previous embodiments, the gas turbine engine is rated to produce 15,000 pounds of thrust or more.

In another embodiment according to any of the previous embodiments, the formula holds true for the majority of the blade rows of the fan drive turbine.

In another embodiment according to any of the previous embodiments, the rotational speed is an approach speed.

In another embodiment according to any of the previous embodiments, the gas turbine engine is rated to produce 1500 lbs. of thrust or more.

In another featured embodiment, turbine module has a fan drive rotor, a high pressure turbine, and an intermediate pressure turbine. The intermediate pressure turbine has a first blade row that includes a number of blades. The first blade row is capable of rotating at a rotational speed, so that when measuring the rotational speed in revolutions per minute:

(number of blades×the rotational speed)/60≥5500 Hz.

In another embodiment according to the previous embodiment, the formula results in a number greater than or equal to 6000.

In another embodiment according to any of the previous embodiments, the formula holds true for the majority of blade rows of the fan drive rotor.

In another embodiment according to any of the previous embodiments, the rotational speed is an approach speed.

These and other features of this application will be best understood from the following specification and drawings, the following of which is a brief description.

DETAILED DESCRIPTION

Figure 1:
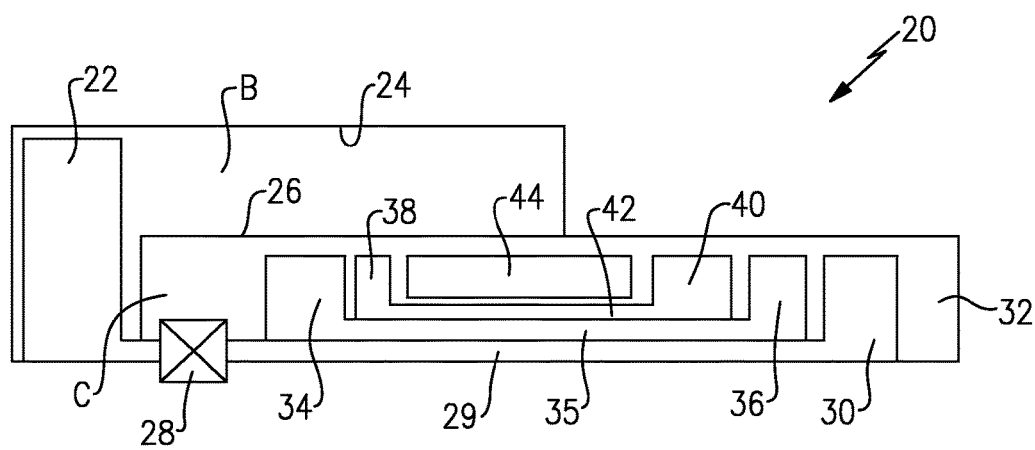
FIG. 1 shows a gas turbine engine.

FIG. 1 schematically shows a gas turbine engine 20. A fan 22 is driven by a fan drive turbine 30 through a gear reduction 28. The fan 22 delivers air into a bypass duct 24 as bypass air B. The fan also delivers air within a housing 26 as core air flow C to a low pressure compressor 34.

The low pressure compressor 34 delivers compressed air into a high pressure compressor 38. The high pressure compressor 38 delivers air into a combustion section 44. The high pressure compressor 38 is driven through a shaft 42 by a high pressure turbine 40. The low pressure compressor 34 is driven by an intermediate pressure turbine 36 through a shaft 35. The gear reduction 28 is driven by the fan drive turbine 30 through a shaft 29.

Products of combustion pass serially over turbine sections 40, 36 and then 30, and then exit through an exhaust nozzle 32.

Figure 2A:
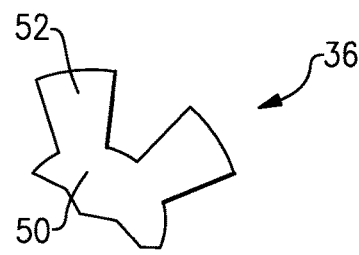
FIG. 2A shows a first feature of an intermediate turbine.
Figure 2B:
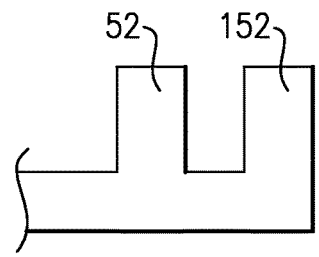
FIG. 2B shows another feature.

As shown in FIG. 2A, the intermediate pressure turbine 36 has a rotor 50 including a plurality of blades 52, shown schematically. As shown in FIG. 2B, there may be several rows 52 and 152 of the blades.

The terms "low" and "high" as applied to speed or pressure for the spools, compressors and turbines are of course relative to each other. That is, the low speed spool operates at a lower speed than the high speed spool and the low pressure sections operate at lower pressures than the higher pressure sections.

The engine 20 may be a high-bypass engine. In one example, a bypass ratio, defined as the volume of air delivered as bypass air B compared to the volume delivered as core air flow C is greater than or equal to about 6. In a further example, the bypass ratio may be greater than or equal to about 10.

A gear ratio provided by the gear reduction 28 may be greater than or equal to about 2.3, and in other embodiments greater than or equal to about 2.5.

It has been discovered that a careful design between the number of rotating blades 52, and the rotational speed of the intermediate pressure turbine can be selected to result in noise frequencies that are less sensitive to human hearing.

A formula has been developed as follows:

(blade count×rotational speed)/60 s≥5500 Hz.

That is, the number of rotating blades 52 in any intermediate pressure turbine stage, multiplied by the rotational speed of the intermediate pressure turbine 36 (in revolutions per minute), divided by 60 seconds should be greater than or equal to 5500 Hz. More narrowly, the amounts should be above 6000 Hz. A worker of ordinary skill in the art would recognize that the 60 second factor is to change revolutions per minute to Hertz, or revolutions per one second.

The operational speed of the intermediate pressure turbine 36 as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

It is envisioned that all of the rows in the intermediate pressure turbine 36 may meet the above formula. However, this application may also extend to intermediate pressure turbines wherein only one of the blade rows in the intermediate pressure turbine meet the above formula. In other embodiments, plural rows meet the formula and in other embodiments, the majority of the rows meet the formula.

This will result in operational noise that would be less sensitive to human hearing.

In embodiments, it may be that the formula can result in a range of greater than or equal to 5500 Hz, and moving higher. Thus, by carefully designing the number of blades 52 and controlling the operational speed of the intermediate pressure turbine 36 (and a worker of ordinary skill in the art would recognize how to control this speed) one can assure that the noise frequencies produced by the low pressure turbine are of less concern to humans.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 Hz number, and even approached 6000 Hz, however, this has not been in combination with the geared architecture, nor in the higher powered engines which have the larger fans, and thus the greater limitations on low pressure turbine or low pressure compressor speed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising: a turbine section including a high pressure turbine, an intermediate pressure turbine and a fan drive turbine; said fan drive turbine driving a gear reduction to in turn drive a fan, and effecting a reduction in a speed of the fan relative to an input speed from said fan drive turbine; said high pressure turbine driving a high pressure compressor; said intermediate pressure turbine driving a low pressure compressor; and said intermediate pressure turbine having a number of turbine blades greater than one in at least one row, and said turbine blades operating at least some of the time at an intermediate pressure turbine rotational speed, and said number of turbine blades in said at least one row, and said rotational speed being such that the following formula holds true for said at least one row of the intermediate pressure turbine (number of blades×intermediate pressure turbine rotational speed in revolutions per minute)/60>5500 Hz.

2. The gas turbine engine as set forth in claim 1, wherein the formula results in a number greater than or equal to 6000 Hz.

3. The gas turbine engine as set forth in claim 1, wherein said rotational speed being an approach speed.

4. The gas turbine engine as set forth in claim 3, wherein the formula holds true for the majority of blade rows of the intermediate pressure turbine.

5. The gas turbine engine as set forth in claim 1, wherein the formula holds true for the majority of blade rows of the intermediate pressure turbine.

6. The gas turbine engine as set forth in claim 1, wherein the fan delivers air into a bypass duct and into a compressor section as core air, and a ratio of the volume of air delivered into the bypass duct compared to the volume of air delivered as core air being greater than or equal to 6.

7. A turbine module comprising: a fan drive rotor, a high pressure turbine, and an intermediate pressure turbine; and said intermediate pressure turbine having a first blade row that includes a number of blades, the first blade row being capable of rotating at a rotational speed, so that when measuring said rotational speed in revolutions per minute: (number of blades×said rotational speed)/60>5500 Hz.

8. The turbine module as set forth in claim 7, wherein the formula results in a number greater than or equal to 6000 Hz.

9. The turbine module as set forth in claim 8, wherein the formula holds true for the majority of blade rows of the fan drive rotor.

10. The turbine module as set forth in claim 9, wherein said rotational speed being an approach speed.

11. The turbine module as set forth in claim 7, wherein said rotational speed being an approach speed.

* * * * *